(12) United States Patent
Chia

(10) Patent No.: US 7,224,412 B2
(45) Date of Patent: May 29, 2007

(54) CEILING SUCTION TYPE DIGITAL TELEVISION DEVICE

(75) Inventor: Chung-Wu Chia, Taipei County (TW)

(73) Assignee: Rightech Corporation, Jhonghe, Taipei County (TW)

( * ) Notice: Subject to any disclaimer, the term of this patent is extended or adjusted under 35 U.S.C. 154(b) by 465 days.

(21) Appl. No.: 10/918,432

(22) Filed: Aug. 16, 2004

(65) Prior Publication Data

US 2006/0033848 A1    Feb. 16, 2006

(51) Int. Cl.
*H04N 5/64* (2006.01)
*H04N 3/14* (2006.01)

(52) U.S. Cl. ...................... 348/837; 348/790

(58) Field of Classification Search ........ 348/836–838, 348/739, 790, 725, 553; 725/75, 76, 78, 725/81, 85, 100, 131, 139, 151; *H04N 3/14, H04N 5/64*
See application file for complete search history.

(56) References Cited

U.S. PATENT DOCUMENTS 4,758,896 A * 7/1988 Ito .............................. 348/790
6,742,185 B1 * 5/2004 Andrews ..................... 348/837

* cited by examiner

*Primary Examiner*—Sherrie Hsia

(57) ABSTRACT

A ceiling suction type digital television device includes a wireless signal received through an aerial, whereupon the wireless signal having a carrier wave is converted into a general signal by means of a demodulator decoding unit and transmitted to a sound processing unit, a video signal processing unit and a sub-title processing unit, whereat encoding and modulation of each respective signal arriving at each of the processing units is carried out, whereafter the signals are sent to an images and sounds output unit. Signal communication coordination is implemented by means of a central processing unit. Furthermore, a video signal circuit board is connected to a connecting terminal of a display circuit board through a connecting cable, further connected to a connector of a ceiling suction type display unit through a connecting cable, whereat the images, sounds and video are televised through a liquid crystal display.

1 Claim, 5 Drawing Sheets

CEILING SUCTION TYPE DIGITAL TELEVISION DEVICE

BACKGROUND OF THE INVENTION (a) Field of the Invention

The present invention relates to a ceiling suction type digital television device having structural characteristics such that a wireless signal is received through an aerial, whereupon the wireless signal having a carrier wave is converted into a general signal by means of a demodulator decoding unit and transmitted to a sound processing unit, a video signal processing unit and a sub-title processing unit, whereat encoding and modulation of each respective signal arriving at each of the processing units is carried out, whereafter the signals are sent to an images and sounds output unit. Signal communication coordination is implemented by means of a central processing unit. Furthermore, a video signal circuit board is connected to a connecting terminal of a display circuit board through a connecting cable, which is further connected to a connector of a ceiling suction type display unit through a connecting cable, whereat the images, sounds and video are televised through a liquid crystal display.

(b) Description of the Prior Art

Usage of a conventional ceiling suction type display device requires operation in conjunction with a vehicle-use stereo system within a vehicle, and is limited to playing compact discs of invariable contents, for instance video compact discs, and so on. Playing such compact discs means a user is unable to freely change the contents of that being played, and thus the user is restricted to viewing the contents of video compact discs carried in the vehicle. That is to say, the conventional ceiling suction type display device is unable to televise video media other than the compact discs already present within the vehicle. If a journey is of an extended period of time, passengers within the vehicle easily become bored and feel the journey tiresome.

Hence, the inventor of the present invention expects to resolve and surmount existent technical difficulties in eliminating the aforementioned shortcomings.

SUMMARY OF THE INVENTION

The present invention provides a ceiling suction type digital television device.

In order to better explicitly disclose advancement and practicability of the present invention, a comparative analysis with conventional art is described hereinafter:

Shortcomings of Conventional Art

1. Limited to televising video signals provided by a stereo system within a vehicle.
2. Low practicability.
3. Unable to provide real-time video.

Advantages of the Present Invention

1. Functionality to link up with wireless digital signals.
2. Provides functionality to view digital television programs within the vehicle.
3. Real-time video provision.
4. Provided with convenience and practicability.
5. Enhances commercial competitiveness.

In conclusion, the present invention in surmounting structural shortcomings of prior art has assuredly achieved effectiveness of anticipated advancement, and moreover, is easily understood by persons unfamiliar with related art. Furthermore, contents of the present invention have not been publicly disclosed prior to this application, and advancement and practicability of the present invention clearly comply with essential elements as required for application of a new patent model. Accordingly, a patent application is proposed herein.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

The embodiment of the present invention provides a ceiling suction type digital TV device.

Referring to FIGS. 1, 2, 3 and 4, which show a ceiling suction type display unit A structured to comprise a display circuit board B and a video signal circuit board C. The video signal circuit board C is configured to embody an aerial C1, a demodulator decoding unit C2, a sound processing unit C3, a video signal processing unit C4, a sub-title processing unit C5, an images and sounds output unit C6, a central processing unit C7 and a connecting cable C8.

Structural characteristics of the present invention are such that a wireless signal is received through an aerial C1, whereupon the wireless signal having a carrier wave is converted into a general signal by means of the demodulator decoding unit C2 and transmitted to the sound processing unit C3, the video signal processing unit C4 and the sub-title processing unit C5, whereat encoding and modulation of each respective signal arriving at each of the processing units is carried out, whereafter the signals are sent to the images and sounds output unit C6. Signal communication coordination is implemented by means of the central processing unit C7. Furthermore, the video signal circuit board C is connected to a connecting terminal B2 of the display circuit board B through the connecting cable C8, which is further connected to a connector A2 of the ceiling suction type display unit A through a connecting cable B1, whereat the images, sounds and video are televised through a liquid crystal display A1.

Figure 1:
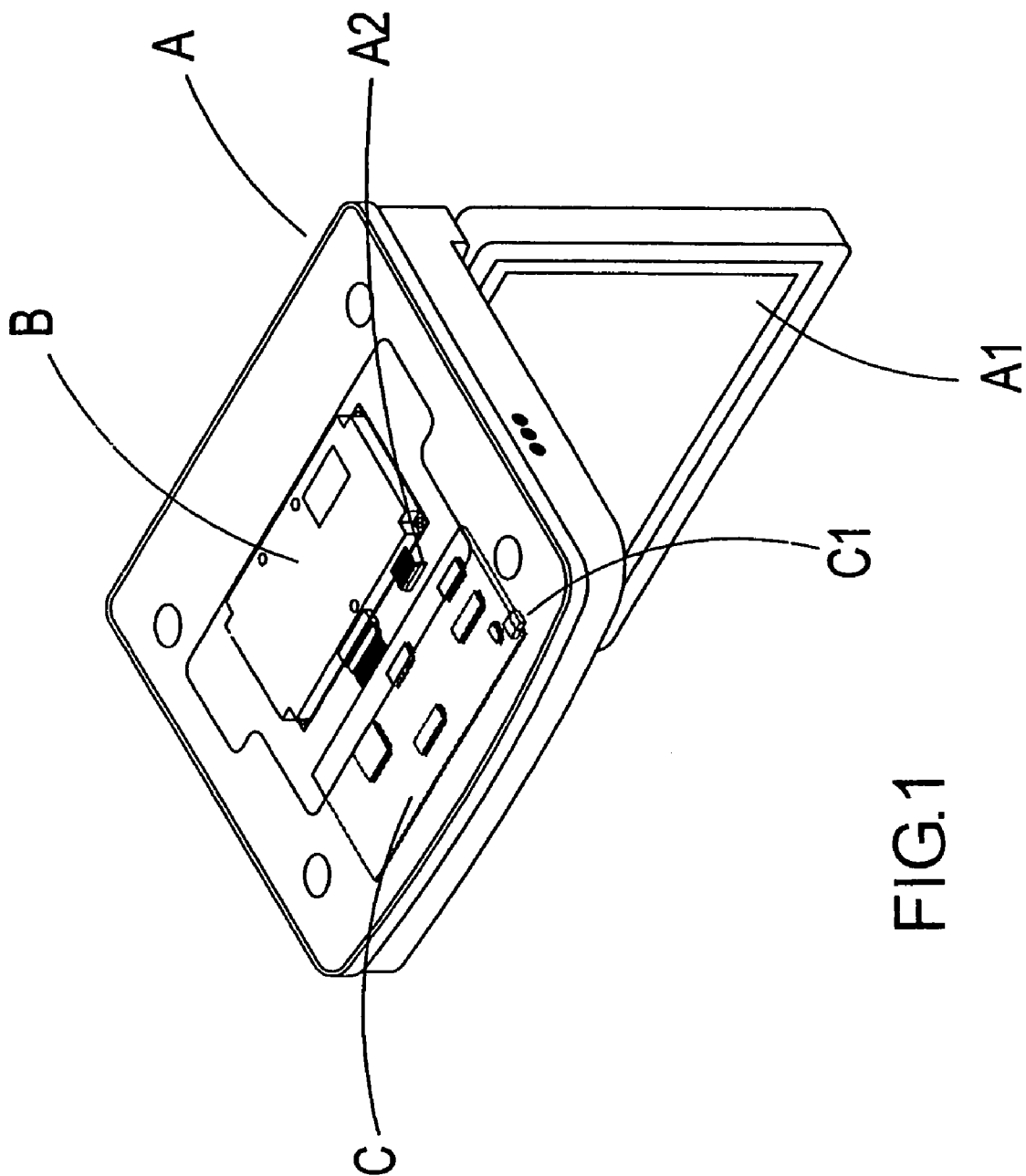
FIG. 1 shows an elevational view according to the present invention.
Figure 2:
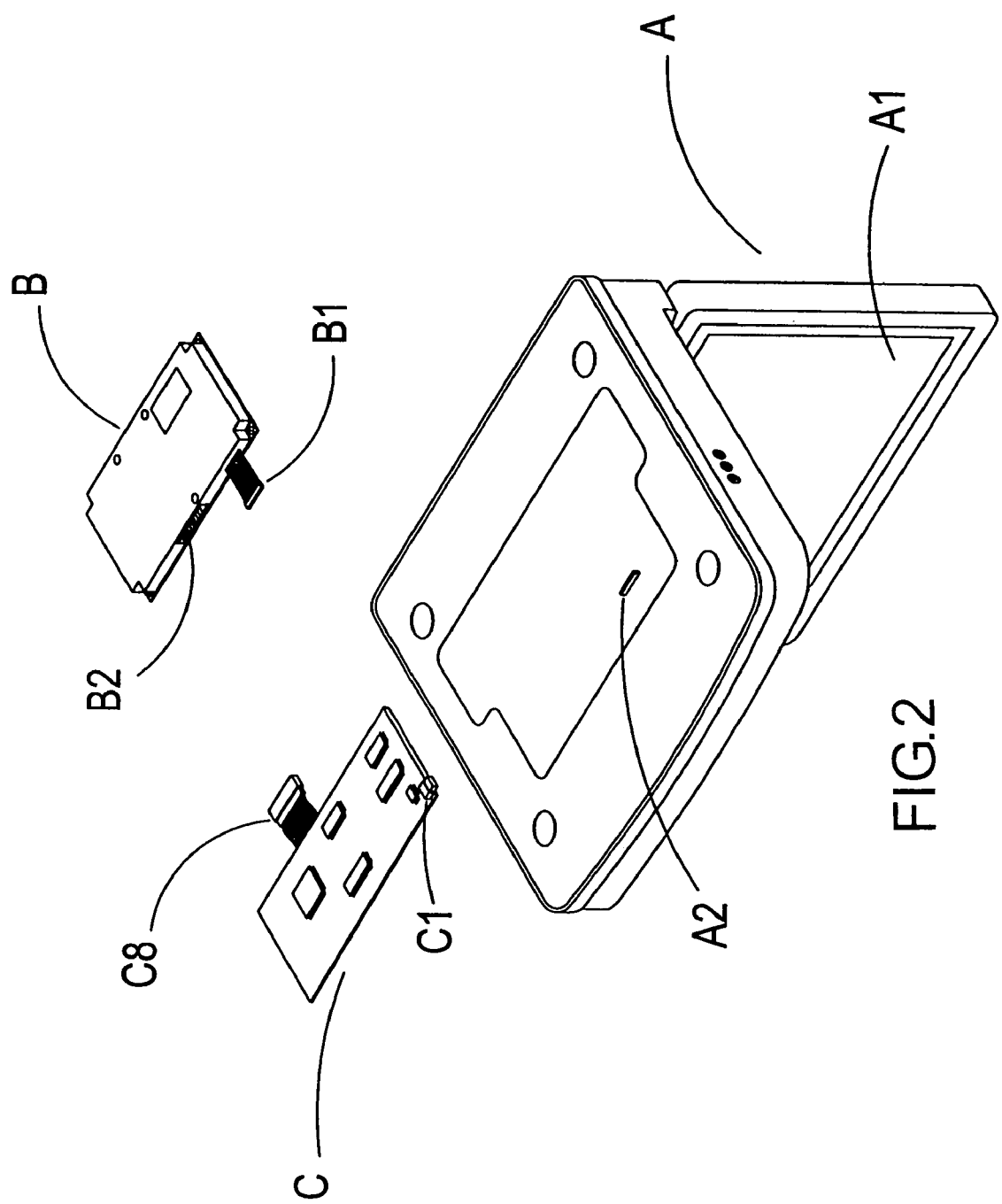
FIG. 2 shows an exploded elevational view according to the present invention.
Figure 3:
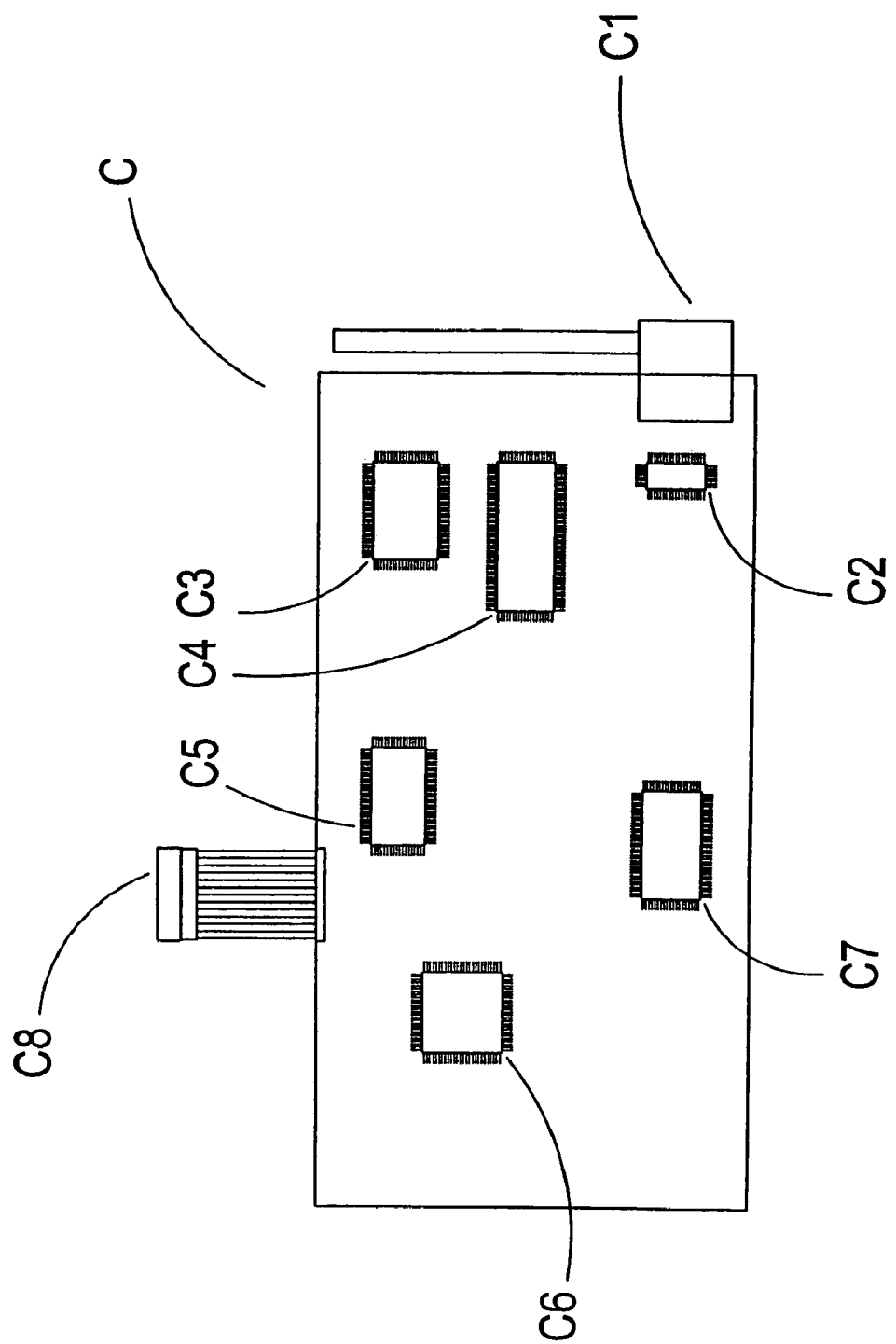
FIG. 3 shows a plane view of a circuit board according to the present invention.
Figure 4:
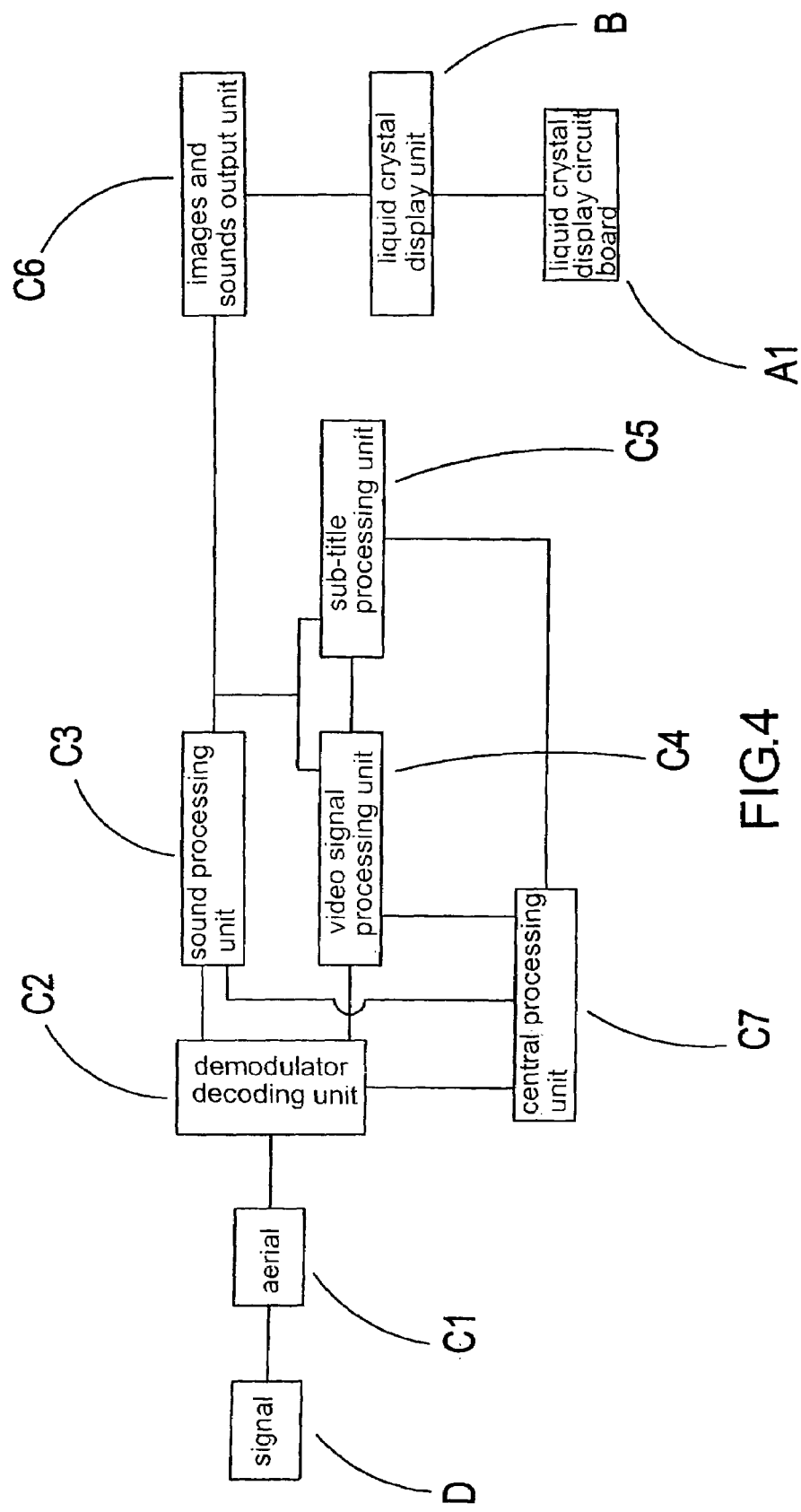
FIG. 4 shows a circuit block diagram according to the present invention.
Figure 5:
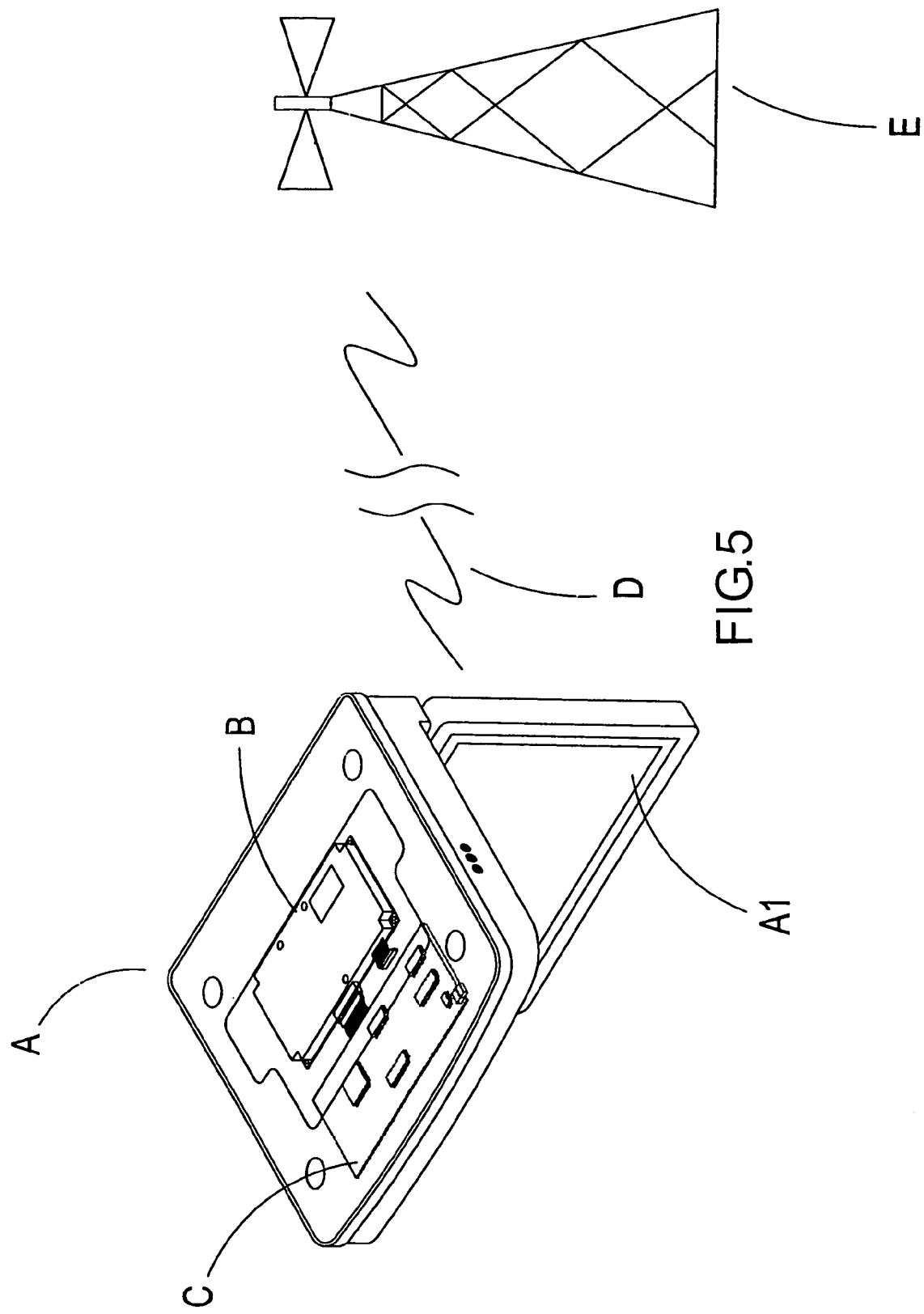
FIG. 5 shows a schematic view of an embodiment according to the present invention.

Referring to FIG. 5, a television station transmits a wireless signal D from a digital wireless program from an aerial E. After an aerial C1 receives the wireless signal D, the wireless signal D undergoes signal modulation decoding and video conversion by means of a video signal circuit board C, whereafter a display circuit board B is utilized to televise images, sounds and video by means of a liquid crystal display A1.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A ceiling suction type digital television device comprising a display circuit board and a video signal circuit board, wherein the video signal circuit board is configured to embody an aerial, a demodulator decoding unit, a sound processing unit, a video signal processing unit, a sub-title processing unit, an images and sounds output unit, a central processing unit and a connecting cable; and characterized in that:

a wireless signal is received through an aerial, whereupon the wireless signal having a carrier wave is converted into a general signal by means of the demodulator decoding unit and transmitted to the sound processing unit, the video signal processing unit and the sub-title processing unit, whereat encoding and modulation of each respective signal arriving at each of the processing units is carried out, whereafter the signals are sent to the images and sounds output unit; signal communication coordination is implemented by means of the central processing unit; furthermore, the video signal circuit board is connected to a connecting terminal of the display circuit board through the connecting cable, which is further connected to a connector of the ceiling suction type display unit through a connecting cable, whereat the images, sounds and video are televised through a liquid crystal display.

* * * * *